United States Patent
Thapliyal et al.

(10) Patent No.: US 10,146,863 B2
(45) Date of Patent: Dec. 4, 2018

(54) EXAMPLE-BASED ITEM CLASSIFICATION

(71) Applicant: GetGo, Inc., Boston, MA (US)

(72) Inventors: Ashish V. Thapliyal, Santa Barbara, CA (US); Anne Marie Lock, Brooklyn, NY (US); Elizabeth Thapliyal, Santa Barbara, CA (US); Ryan W. Kasper, Santa Barbara, CA (US); Stefan Alexander von Imhof, Santa Barbara, CA (US)

(73) Assignee: GetGo, Inc., Boston, MA (US)

( * ) Notice: Subject to any disclaimer, the term of this patent is extended or adjusted under 35 U.S.C. 154(b) by 835 days.

(21) Appl. No.: 14/543,230

(22) Filed: Nov. 17, 2014

(65) Prior Publication Data

US 2016/0140222 A1   May 19, 2016

(51) Int. Cl.
*G06F 7/00* (2006.01)
*G06F 17/30* (2006.01)
*G06Q 10/10* (2012.01)

(52) U.S. Cl.
CPC .. *G06F 17/30722* (2013.01); *G06F 17/30654* (2013.01); *G06Q 10/107* (2013.01)

(58) Field of Classification Search
CPC ........ G06F 17/30722; G06F 17/30654; G06Q 10/107
See application file for complete search history.

(56) References Cited

U.S. PATENT DOCUMENTS

| | | | |
|---|---|---|---|
| 7,185,001 B1* | 2/2007 | Burdick | G06F 17/3064 |
| 7,668,849 B1* | 2/2010 | Narancic | G06F 17/3089 707/811 |
| 2007/0094230 A1* | 4/2007 | Subramaniam | G06F 17/30598 706/62 |
| 2010/0179961 A1 | 7/2010 | Berry et al. | |

* cited by examiner

*Primary Examiner* — Usmaan Saeed
*Assistant Examiner* — Paul Kim
(74) *Attorney, Agent, or Firm* — BainwoodHuang

(57) ABSTRACT

Item classification rules are created based on examples selected by a user, such as by selecting a subset of emails, and the rule is used across a larger set of items to obtain automatic classification of similar items according to the rule. Based on an analysis, a candidate classification rule is generated identifying text-based features shared among the items of the subset. The user can review the candidate rule as well as a resultant subset of items generated by the rule, and either accept the candidate rule or make an adjustment to the examples and then perform one or more iterations of the analysis to refine the rule. Adjustments can be made by removing items incorrectly included in a resultant subset and/or adding items incorrectly excluded from a resultant subset, and using the adjusted subset in a next iteration.

20 Claims, 3 Drawing Sheets

EXAMPLE-BASED ITEM CLASSIFICATION

BACKGROUND

The disclosure is related to the field of automatic classification of items in an application program, such as electronic mail (email) messages in an email application.

It is known to apply classification or categorization to items in application programs. In an email program, for example, emails may be sorted or categorized by action of a user-created "rule" specifying categorization criteria. Rules are created using a structured rule-creating utility of the application program. A user is presented with a display panel containing various fields of email messages, such as sender, recipient, subject, etc., and the user enters names, addresses, phrases or other text values and then saves the rule. The rule can be applied automatically based on events such as receiving a new email, sending a new email, etc. As a simple example, a user can create a rule specifying that emails received from a particular sender be moved to a specified folder. The rule helps the user to efficiently organize the messages in a desired manner.

SUMMARY

While classification rules can be used to great benefit, one drawback of existing systems is the need for a user to manually create the rules such as in the manner described above. The process may be seen as cumbersome and time-consuming. It can interfere with user productivity in the moment, and some users may see the process as an interruption or diversion and avoid using it, foregoing the benefits of automatic classification.

A technique is disclosed for generating item classification rules based on examples selected by a user. When used in the context of email, for example, a user might drag and drop a few emails into a new rule, and the email program automatically creates a classification rule based on the examples. The rule can then be used across a larger set of items to obtain automatic classification of similar items according to the rule. The technique can overcome or reduce the need for users to manually create classification rules, promoting efficiency and streamlined operation.

More particularly, a method is disclosed of operating a computerized device to generate a classification rule for use in an application program to selectively classify items of a set of items and display classified items to a user. In one example the application program is an email program such as an email client, and the items are emails.

The method includes receiving a user selection of an example subset of the set of items, and performing an analysis on the example subset to find one or more shared text-based features that are shared across all items of the example subset. Based on the analysis, a candidate classification rule is generated identifying the shared text-based features. The candidate classification rule is applied to the set of items to identify a resultant subset of the items satisfying the candidate classification rule, the resultant subset generally being a superset of the example subset. As an example with reference to an email application, the example items may be emails all sent from the same sender. The rule specifies the shared sender name, and the resultant subset is all emails in the user's In box having that sender name.

The method further includes displaying the resultant subset to the user, and receiving user input that indicates, based on user review of the resultant subset, whether the candidate classification rule is accepted. If the user input indicates that the candidate classification rule is accepted, then the candidate classification rule is finalized into a final classification rule for future use by the application program in classifying items. Alternatively, the user might indicate rejection of the candidate classification rule by somehow altering the contents of the resultant subset, such as by removing an item that should not be within the rule or by adding an omitted item that should be within the rule. This user action forms an adjusted example subset that is then used in a repetition of the process, which may yield a final rule or may be repeated again based on a further adjusted example subset.

The example-based analysis can make the process much easier for the user than in prior systems, enabling a user to more easily obtain the benefits of automated classification without a large investment of time and effort into defining rules. The technique also retains the ability to generate a specific and accurate rule through use of the repeated analyses with successively adjusted examples.

In one aspect the technique may employ a multi-step analysis that stops at the first step that yields a usable candidate rule. This technique inherently gives greater weight to some types of commonality among items. For example, the analysis may first look at sender and/or recipient addresses among an example subset of emails, and only upon finding no commonality among these items then progress to looking at other features of the emails, such as their textual message contents for example.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
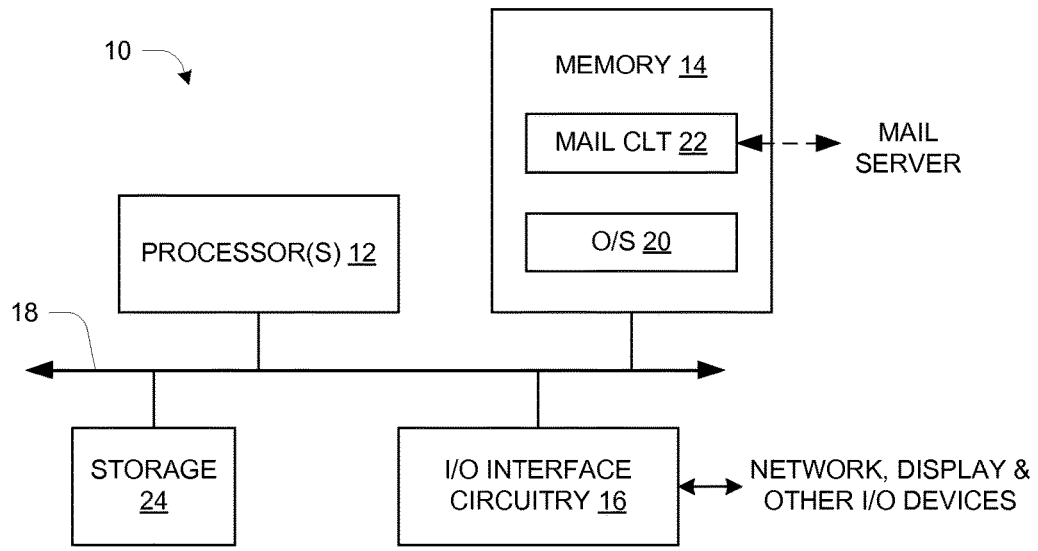
FIG. 1 is a block diagram of a computerized device such as a personal computer or smartphone.

FIG. 1 shows a configuration of computerized device 10. The hardware includes one or more processors 12, memory 14, and interface circuitry 16 interconnected by data interconnections 18 such as one or more high-speed data buses. The interface circuitry 16 provides a hardware connection to an external network, a user interface display, and other input/output (I/O) devices. As shown, the memory 14 stores an operating system (O/S) 20 and an application program referred to as a "mail client" (MAIL CLT) 22 that interacts with a separate mail server. The processor(s) 12 with connected memory 14 may also be referred to as "processing circuitry" herein. There may also be local storage 24 such as a local-attached disk drive or Flash drive. In operation, the processor(s) 40 execute computer program instructions of the O/S 20 and mail client 22 to cause the hardware to function in a software-defined manner. Thus the computer hardware executing instructions of the mail client application 22, for example, can be referred to as a mail client circuit or mail client component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

The computerized device 10 of FIG. 1 may be realized in any of a number of commercial forms, including for example a conventional desktop computer, a portable computer, and a smaller portable device such as a smartphone. In conventional desktop and portable computer environments, the mail client 22 may be a so-called "fat" application, i.e., one that is installed on the user device, contains all the required data and program elements (e.g., as libraries), and is executed completely locally on a user device. However, it will be appreciated that the disclosed techniques may also be realized by other forms of implementation. In particular, the techniques may also be used in so-called thin-client or Web access environments in which many functions are performed by memory-resident applets in the context of a browser application executed on a user device, with separate server code being executed at a separate webmail server.

Even more generally, the disclosed techniques are not necessarily limited to electronic mail. Example-based classification such as described herein may be used in other applications requiring efficient classification and organizing of large numbers of data items.

Figure 2:
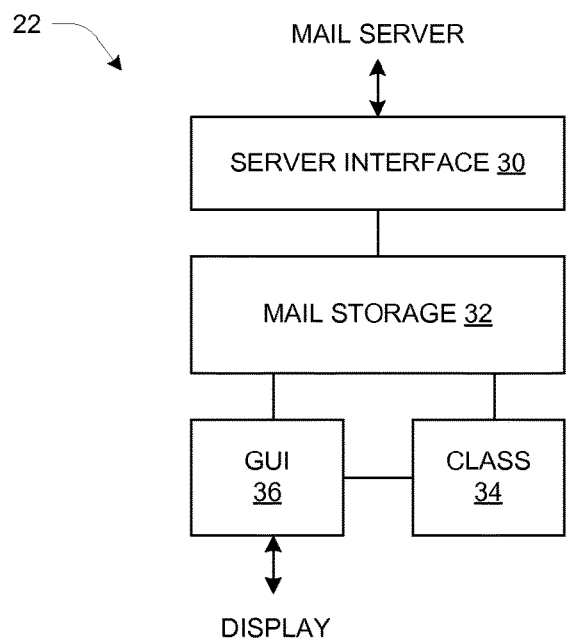
FIG. 2 is a block diagram of software-implemented functional components of a computerized device.

FIG. 2 shows the organization of the mail client 22. Major components include a server interface 30, mail storage 32, a classifier (CLASS) 34 and a graphical user interface (GUI) 36. As generally known in the art, the mail client 22 communicates with the remote mail server using a mail delivery protocol such as Post Office Protocol (POP), Internet Message Access Protocol (IMAP), etc. to send and receive emails. Received emails, and generally sent emails as well, are stored in the mail storage 32, which may be realized for example as a large, locally stored mail file such as known in the art. Both the classifier 34 and GUI 36 operate upon emails that are stored in the mail storage 32. The GUI 36 provides conventional functions such as viewing contents of the mail storage 32 (e.g. using a folder type of paradigm as generally known), reading emails, and composing and sending new emails. As described more particularly below, the classifier 34 provides functions for automated classification of emails for improved organization and effectiveness of the email user. Using classification, a large set of emails in the mail storage 32 can be more easily organized so that they are more accessible and useful to the email user.

More particularly, and as described more below, the classifier 34 works in conjunction with the GUI 36 to provide for email classification based on example groupings that are created by the email user. The groupings may be created by a user selecting a subset of a larger set of items. This feature lets a user select a few example emails (e.g., using check boxes, drag and drop, etc.), and generate a candidate classification rule based on the selected emails. Further, the user is showed a candidate rule and corresponding emails that are selected and not selected by the rule. The user can then help refine the candidate rule, such as by identifying misclassified emails, and the system automatically adjusts/refines the candidate rule based on the user input. The process may be repeated until the user is satisfied with an adjusted/refined candidate rule, at which point the rule is finalized and made available for future use in classifying the user's emails.

Figure 3:
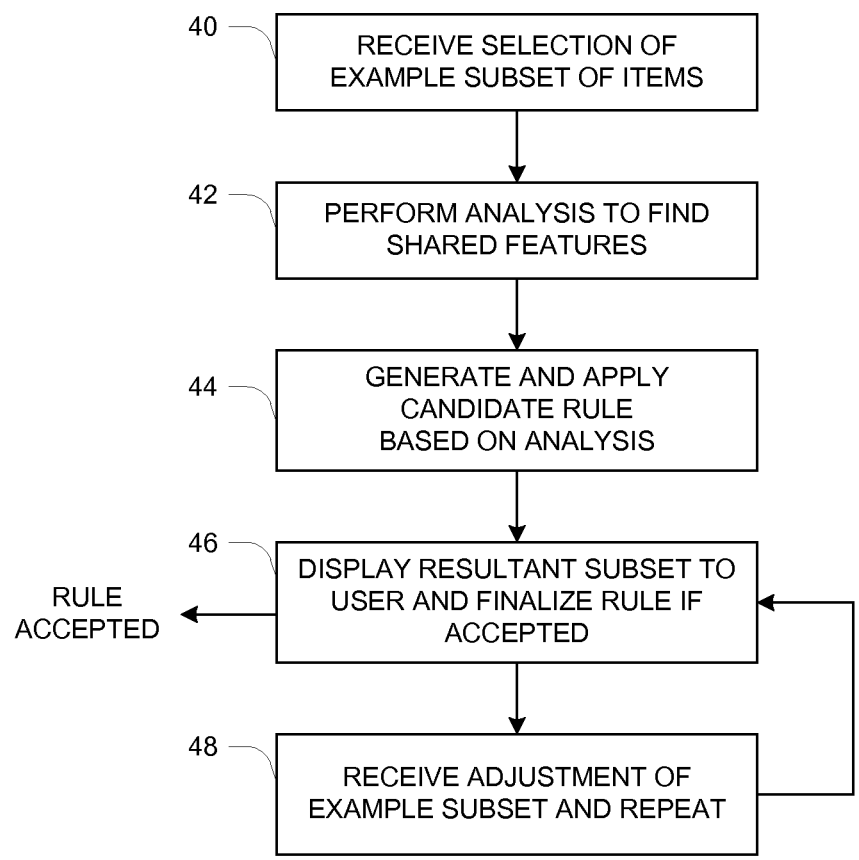
FIGS. 3 and 4 are flow diagrams of operation of a computerized device.

FIG. 3 describes the automated classification process at a high level. The description uses the term "subset" to refer to a subset of some larger "set" of items. The definition and scope of the larger set may vary and may depend on configuration, context, or other circumstances. In one example, the larger set may be the set of emails in an In box of a user's email application. In another example, the larger set may be a set of items displayed to the user, such as in a list or array. In another example, the larger set may be all the items across an entire application, e.g., all emails stored by an email client.

At 40, the classifier 34 receives, via the GUI 36, user selection of an example subset of items of a larger set. Selection can be made in a variety of ways. In one example, a user may select-click on several items from a list of items and then in some manner initiate the auto classification, such as by selecting a menu item, dragging the selection into an icon/graphic for a new rule, etc. The classifier 34 receives the selection as an identification of selected emails that are stored in the mail storage 32.

At 42, the classifier 34 performs an analysis to identify features (text-based) that are shared among the selected items, i.e., words/phrases/names that are contained in all the items of the subset. This analysis focuses on relatively uncommon words or phrases, and/or special values such as names or email addresses. It ignores very common words such as articles, conjunctions, prepositions, etc. Also, it may employ a hierarchy or weighting scheme to attach more significance to some shared features than others. Natural language processing (NLP) procedures such as stemming may be employed. Additional detail is given below.

At 44, the classifier 34 generates a candidate rule based on the result of the analysis. As an example, if the classifier identifies the items as all having the same sender name "jane(at)company(dot)com", it may generate a rule such as:

sender-name IS jane(at)company(dot)com

In the above example, parentheticals are used instead of the corresponding punctuation characters "@" and "." to accommodate US rules regarding the content of US patent documents.

Also at 44, the candidate rule is applied to the larger set to find a resultant subset of all items satisfying the rule. In general, the resultant subset is a superset of the example set created by the user. For example, if the user has selected three emails with sender name "jane . . . " as above, and the rule that is generated is a rule requiring this sender name, then the resultant subset will be all items of the larger set of items having the sender name "jane . . . ".

At 46, the classifier 34 displays the resultant subset to the user and receives further user input for proceeding. If the user indicates his/her satisfaction with the candidate rule, then the rule is finalized and made available for regular future use in automatically classifying emails that are sent/received by the user. For this purpose, the classifier 34 may maintain a store of finalized and actively used classification rules, and it applies these rules regularly during subsequent regular operation of the mail client 22. It may interface with the GUI 36 as necessary to generate icons, shadings, or other graphical indications of classification of emails. The classifier 34 and GUI 36 may also realize some manner of graphical organization using the classification, using a foldering or similar paradigm.

If at 46 the user does not accept the candidate rule, then at 48 there is a process of receiving further input from the user to adjust the examples on which the rule should be based, and then repeating the process using an adjusted example subset rather than the original example subset. As an example, the user may somehow indicate that an item contained in the resultant subset should not be part of the classification to be effected by the rule, or alternatively that some non-selected item should be part of it. Based on this additional information, the classifier 34 performs additional analysis in an attempt to refine the rule so that it will yield the adjusted example subset identified by the user. An example of an adjustment process that may be performed at 48 is given below. The process then returns to 46 to provide another opportunity for either acceptance of the rule or further iteration.

Figure 4:
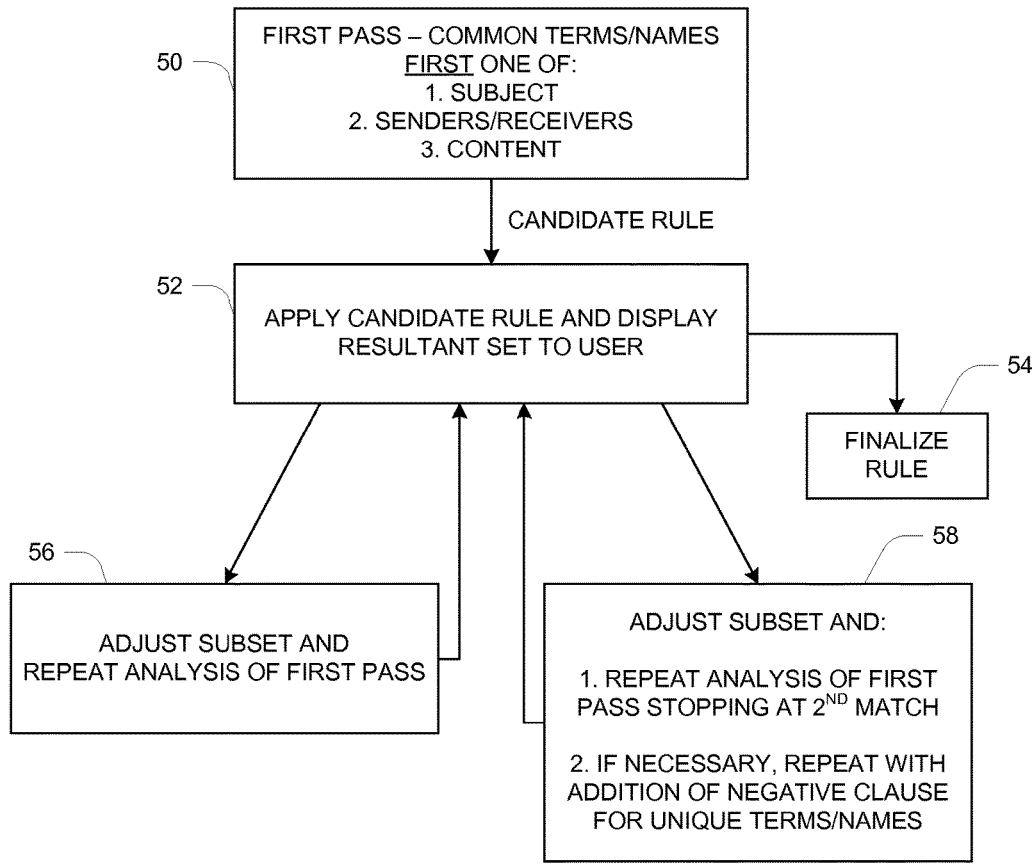

FIG. 4 shows an example of portions of the process of FIG. 3 in greater detail, specifically focusing on the adjustment at 48. In this example the process uses contents of different structured email fields: Sender, Recipient, cc, bcc, Date/Time Sent, Date/Time Received, and Normalized Subject (subject line modified to remove noise terms such as "re:", "fwd:" etc.). Further, the process may split the email content into the main content and included content (such as earlier message that are copied into replies and forwards in an email thread). All of these are used as inputs which are called email "features".

At 50, the process performs a first pass of analysis of the user-selected example subset of items. In this example, a three-level hierarchy is employed: first Subject, then Senders/Recipients, and finally Content. In this first pass, the analysis ends when the first (highest level) non-empty result set is found.

As an example, the following specific technique may be used:

1. Extract the words and phrases that are shared among the Normalized Subjects of the selected items. From this list of extracted words and phrases, any that are very common (e.g., conjunctions, prepositions, etc.) are removed. If the resulting set is not empty, then the candidate rule is generated as specifying that the subject field contain the shared words/phrases. In this case, the title of the rule might be set to: "Emails that include <words/phrases> in their subject". Then the processing at 50 is complete.
2. If the resultant subset in step 1 is empty, then a similar analysis is done based on the sender and/or recipient fields. This portion may also use multiple hierarchically arranged sub-steps that assign higher priority to one field over another other, e.g., first look for shared senders and then look for shared recipients. In one specific example, the order of analysis can be shared senders, then shared recipients, then shared values in either sender or recipient, as follows:
2.1 It may first be determined whether there are selected emails having one or more shared senders (i.e., same email address or other sender identifier in the sender field(s) of all the emails). If so, then the candidate rule is generated as specifying that the sender field have the shared sender identifier, and in this case the title of the rule might be set to: "Emails from <identified sender (s)>". Then the processing at 50 is complete.
2.2 If the processing of 2.1 indicates there are no shared senders, it is next determined whether there are recipients that are shared among the example emails. This assessment may either consider or disregard any sharing of the current user, i.e., the user for which the processing is being performed. If there are shared recipients, then the candidate rule is generated as specifying that the recipient field have the shared recipient identifier, and in this case the title of the rule might be set to: "Emails to <identified recipient(s)>". Then the processing at 50 is complete
2.3 If the processing of 2.1 and 2.2 indicates that there are no shared senders or recipients, it is next determined whether there are any shared email addresses (or other sender/recipient identifiers) in either the senders or recipients across all the example emails. This assessment might be across all address fields including cc and bcc fields. An example of this situation is an email exchange in which the identifiers of two participants appear alternately as sender and recipient. If so, then the candidate rule is generated as specifying that the recipient field OR the sender field contain the shared identifier, and in this case the title of the rule might be set to: "Emails between <identified sender(s) and recipient(s)>". Then the processing at 50 is complete.
3. If the processing of #2 above results in an empty set, then the message contents of the emails are compared, similar to the comparison of the subject fields in #1 above. Here, "message contents" can refer to the text contents of the message body of the email, i.e., the text message that a user has entered. It may also refer to the contents of an attachment. These are example of unstructured portions of an email. As with the structured fields, any very common words/phrases (e.g., conjunctions, prepositions, etc.) are removed. If shared words/phrases are found in the remaining text, then the candidate rule is generated as specifying that the message contents contain the shared words or phrases. In this case, the title may be "Emails that contain <shared words and phrases>". Then the processing at 50 is complete.

The above is only one example. Other analyses that may be used based on shared values for email features such as date/time, size, presence of attachments, etc.

There may be several variations to the above process. For example, the various steps might be performed simultaneously and the respective results combined in some manner, generally leading to a narrower (more specific) candidate rule. However, the narrower the rule, the more likely that it will not match other emails the user wants to match. So as a general matter it may be preferable to err on the side of over-inclusiveness (more generality) in the first pass processing. In the above-described processing at 50, the steps are performed in order and processing stops when the first rule is generated. This approach promotes more general rules.

Upon completion of the processing at 50, it is assumed there is a candidate rule. There may be other logic for handling the uncommon case of no commonality at all among the example subset of items. At 52, the candidate rule is first applied to the full set of emails in order to generate a resultant subset of all emails satisfying the rule, then the resultant subset of emails is presented to the user. This reflects part of the power of the technique. The classifier 34 need not be shown every example or potential member of the class that will be defined by the rule, but rather only some smaller number of examples, and the rules that are generated automatically identify all instances that satisfy the rule.

In general, it may be desirable to show the user those emails for which there is low confidence in the classification. Those having higher confidence need not be shown to the user. Assessing and operating based on confidence levels can be more important in certain kinds of embodiments, including those applying machine learning techniques.

As described above, if the candidate rule presented at 52 is acceptable to the user, the user may indicate acceptance and then at 54 the classifier 34 finalizes the candidate rule (as potentially adjusted) into a final rule which will be used going forward. Otherwise, the user adjusts the resultant subset of items in some manner, and an additional pass of processing similar to that at 50 is performed. The processing may depend on whether the rule incorrectly omits a desired email (incorrect negative match) or incorrectly includes a non-desired email (incorrect positive match). These two cases correspond to processing at 56 and 58 respectively.

At 56, when the user indicates that an email was incorrectly omitted from the resultant subset from 52 (referred to as a "false negative"), the omitted email is added to the resultant subset to form an adjusted example subset that is used in a repetition (second pass) of the processing at 50. It will be appreciated that in general this will yield a second candidate rule differing from the first one in either or both the hierarchical level of match (i.e., matching at a later step) and/or the shared word, phrase, name or other identifier. Processing then returns to 52 with an adjusted resultant subset based on applying the new candidate rule. Again the options are acceptance and finalizing at 54, or further adjustment by another pass of 56 and/or 58. There may be some escape mechanism to limit the number of iterations and allow the user to either start over or abandon the task entirely.

At 58, when the user indicates that an email was incorrectly included in the resultant subset from 52 ("false positive"), the incorrectly included email is removed from the resultant subset to form an adjusted example subset, and an analysis like that at 50 is again performed but with a slight difference. It will be appreciated that in this case the analysis at 50 will still encounter the same first match, and if the analysis were to stop then no progress will have been made. Therefore, the analysis proceeds past the first match to a second match and then determines whether the second match omits the false positive email. If so, then processing returns to 52 with the adjusted/refined candidate rule and its corresponding results, and further processing is as described above (either finalization or further refinement per user input). If in 58 a given match does not omit the false positive email, then the analysis is continued to additional terms and/or lower levels as possible, with the test for the false positive email and potential return to 52 being repeated at each match.

If the above initial analysis at 58 does not yield any additional feature that can distinguish the false positive example email, a second type of analysis can be performed that includes a negative or exception clause. Thus at any given level, the search is for all emails with the same shared features, except for any that also include a feature that is unique to the false positive example email. As an example, a subset of emails are all sent to the same recipients A and B, and a false positive email is also uniquely send to recipient C. A rule generated in this example might specify that the recipient fields include A and B and do not include C.

The processing of FIG. 4, which is heuristic-based, is generally only one type of processing that can be used in the overall process of FIG. 3. Other techniques may be used. For example, supervised machine learning techniques may be used that can work with a small set of positive only examples. A tuning process can be achieved by applying semi-supervised machine learning algorithms that work with few examples.

As noted above, the system may automatically suggest a name/title for a classification rule that is generated. The user may be given the option of changing the name/title.

While the above description is directed to use in the context of email, the disclosed techniques can be extended to other domains where classification rules are utilized, and in general they provide for automatic rule generation based on a few positive examples. Rule tuning can be performed through iteration and refinement as describe above, and/or it may be more manual (i.e., a user directly editing the contents of a candidate rule).

While various embodiments of the invention have been particularly shown and described, it will be understood by those skilled in the art that various changes in form and details may be made therein without departing from the spirit and scope of the invention as defined by the appended claims.

What is claimed is:

1. A method of operating a computerized device according to an electronic mail application program to selectively classify items of a set of electronic mail messages and display classified electronic mail messages to a user, comprising:

receiving a user selection of an example subset of the set of electronic mail messages;

performing an analysis on the example subset to find one or more shared text-based features that are shared across all items of the example subset, and based on the analysis generating a candidate classification rule identifying the shared text-based features, the analysis including multiple steps performed in sequence for respective distinct fields of the electronic mail messages, wherein in a first pass the analysis stops at a first step at which text content is found that is shared across all items of the example subset, and wherein the analysis for a next iteration continues past the first step to a second step at which text content is found that is shared across all items of the example subset;

applying the candidate classification rule to the set of electronic mail messages to identify a resultant subset of the electronic mail messages satisfying the candidate classification rule, the resultant subset being a superset of the example subset;

displaying the resultant subset to the user and receiving user input indicating, based on user review of the resultant subset, whether the candidate classification rule is accepted;

if the user input indicates that the candidate classification rule is accepted, then finalizing the candidate classification rule into a final classification rule, and otherwise repeating the above steps one or more times for respective adjusted example subsets of the set of electronic mail messages until a respective adjusted candidate classification rule is accepted and finalized into the final classification rule, the adjusted example subset for a given repetition being formed by the user identifying a false match and/or a false non-match with respect to the resultant subset identified in the preceding repetition; and automatically applying the final classification rule in subsequent operation of the electronic mail application program to identify electronic mail messages satisfying the final classification rule and to display the identified electronic mail messages to the user in a manner reflecting their identification as satisfying the final classification rule.

2. A method according to claim 1, wherein receiving the user selection includes operating a graphical user interface to respond to a set of graphical user selection actions on a presentation of the set of electronic mail messages to identify the items of the example subset stored in an item store.

3. A method according to claim 1, wherein the field of the electronic mail messages include one or more structured fields and one or more unstructured fields, and wherein the analysis includes multiple steps performed in sequence beginning with text content of the structured fields of the electronic mail messages and proceeding to text content of the unstructured fields of the electronic mail messages, the analysis stopping at a first step at which text content is found that is shared across all electronic mail messages of the example subset.

4. A method according to claim 3, wherein the structured fields include one or more sender fields and one or more recipient fields, and the unstructured fields include a message body containing user-created message text.

5. A method according to claim 3, wherein the unstructured fields include an attachment containing arbitrary text.

6. A method according to claim 1, wherein receiving the user input includes receiving an identification of an electronic mail message omitted from the resultant subset, and further including adding the omitted electronic mail message to the example subset to form the adjusted example subset for a next repetition.

7. A method according to claim 1, wherein receiving the user input includes receiving an identification of an electronic mail message incorrectly included the resultant subset, and further including removing the incorrectly included electronic mail message from the example subset to form the adjusted example subset for a next repetition.

8. A method according to claim 1, further including, upon completing one or more of the repetitions with respective adjusted example subsets without the user accepting the respective adjusted candidate rule, incorporating a negative condition and performing additional repetitions using both a respective adjusted example subset and the negative condition, the negative condition specifying a text-based feature contained in the incorrectly included electronic mail message and not shared with the electronic mail messages of the adjusted example subset, the negative condition used to exclude electronic mail messages containing the text-based feature from the resultant subset of one or more of the additional repetitions.

9. A method according to claim 1, wherein displaying the resultant subset includes displaying first electronic mail messages for which there is a first confidence level about proper classification, and omitting second electronic mail messages for which there is a second, higher confidence level about proper classification.

10. A method according to claim 1, further including displaying to the user one or more electronic mail messages omitted from the resultant subset to enable the user to add the omitted electronic mail messages to the example subset to form the adjusted example subset for a next repetition.

11. A non-transitory computer-readable medium storing computer program instructions of an electronic mail application program, the instructions being executable by a computer to cause the computer to selectively classify items of a set of electronic mail messages and display classified electronic mail messages to a user, the method including:
   receiving a user selection of an example subset of the set of electronic mail messages;
   performing an analysis on the example subset to find one or more shared text-based features that are shared across all items of the example subset, and based on the analysis generating a candidate classification rule identifying the shared text-based features, the analysis including multiple steps performed in sequence for respective distinct fields of the electronic mail messages, wherein in a first pass the analysis stops at a first step at which text content is found that is shared across all items of the example subset, and wherein the analysis for a next iteration continues past the first step to a second step at which text content is found that is shared across all items of the example subset;
   applying the candidate classification rule to the set of electronic mail messages to identify a resultant subset of the electronic mail messages satisfying the candidate classification rule, the resultant subset being a superset of the example subset;
   displaying the resultant subset to the user and receiving user input indicating, based on user review of the resultant subset, whether the candidate classification rule is accepted;
   if the user input indicates that the candidate classification rule is accepted, then finalizing the candidate classification rule into a final classification rule, and otherwise repeating the above steps one or more times for respective adjusted example subsets of the set of electronic mail messages until a respective adjusted candidate classification rule is accepted and finalized into the final classification rule, the adjusted example subset for a given repetition being formed by the user identifying a false match and/or a false non-match with respect to the resultant subset identified in the preceding repetition; and
   automatically applying the final classification rule in subsequent operation of the electronic mail application program to identify electronic mail messages satisfying the final classification rule and to display the identified electronic mail messages to the user in a manner reflecting their identification as satisfying the final classification rule.

12. A non-transitory computer-readable medium according to claim 11, wherein each of the electronic mail messages includes one or more structured fields and one or more unstructured fields, and wherein the analysis includes multiple steps performed in sequence beginning with text content of the structured fields of the electronic mail messages and proceeding to text content of the unstructured fields of the electronic mail messages, the analysis stopping at a first step at which text content is found that is shared across all electronic mail messages of the example subset.

13. A non-transitory computer-readable medium according to claim 12, wherein the structured fields include one or more sender fields and one or more recipient fields, and the unstructured fields include a message body containing user-created message text.

14. A non-transitory computer-readable medium according to claim 11, wherein receiving the user input includes receiving an identification of an electronic mail message omitted from the resultant subset, and further including adding the omitted electronic mail message to the example subset to form the adjusted example subset for a next repetition.

15. A non-transitory computer-readable medium according to claim 11, wherein receiving the user input includes receiving an identification of an electronic mail message incorrectly included the resultant subset, and further including removing the incorrectly included electronic mail message from the example subset to form the adjusted example subset for a next repetition.

16. A non-transitory computer-readable medium according to claim 11, wherein the method performed by the computer further includes, upon completing one or more of the repetitions with respective adjusted example subsets without the user accepting the respective adjusted candidate rule, incorporating a negative condition and performing additional repetitions using both a respective adjusted example subset and the negative condition, the negative condition specifying a text-based feature contained in the incorrectly included electronic mail message and not shared with the electronic mail messages of the adjusted example subset, the negative condition used to exclude electronic mail messages containing the text-based feature from the resultant subset of one or more of the additional repetitions.

17. A non-transitory computer-readable medium according to claim 11, wherein displaying the resultant subset includes displaying first electronic mail messages for which there is a first confidence level about proper classification, and omitting second electronic mail messages for which there is a second, higher confidence level about proper classification.

18. A non-transitory computer-readable medium according to claim 11, wherein the method performed by the computer further includes displaying to the user one or more electronic mail messages omitted from the resultant subset to enable the user to add the omitted electronic mail message to the example subset to form the adjusted example subset for a next repetition.

19. A method according to claim 1, further including:

maintaining a store of finalized and actively used classification rules regularly applied during operation of the electronic mail application program; and adding the final classification rule to the store and retrieving the final classification rule from the store when applying it in subsequent operation.

20. A method according to claim 1, wherein displaying the identified electronic mail messages to the user includes interfacing with a graphical user interface of the computer to generate one or more of icons, shadings, and foldering as graphical indications of classification of the electronic mail messages.

\* \* \* \* \*